US010802670B2

(12) United States Patent
Brette et al.

(10) Patent No.: US 10,802,670 B2
(45) Date of Patent: Oct. 13, 2020

(54) USER INTERFACE FOR POLYMORPHIC LOOKUP

(71) Applicant: salesforce.com, inc., San Francisco, CA (US)

(72) Inventors: Marc Brette, Montbonnot (FR); Glenn Sorrentino, Oakland, CA (US); James Vogt, San Bruno, CA (US); Naveen Veeravalli, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 685 days.

(21) Appl. No.: 15/067,596

(22) Filed: Mar. 11, 2016

(65) Prior Publication Data

US 2017/0262544 A1 Sep. 14, 2017

(51) Int. Cl.
| | |
|---|---|
| *G06F 3/00* | (2006.01) |
| *G06F 3/0482* | (2013.01) |
| *G06F 16/2457* | (2019.01) |
| *G06F 3/0484* | (2013.01) |
| *G06F 3/048* | (2013.01) |
| *G06F 16/9535* | (2019.01) |

(52) U.S. Cl.
CPC .......... *G06F 3/0482* (2013.01); *G06F 3/048* (2013.01); *G06F 3/0484* (2013.01); *G06F 16/24578* (2019.01); *G06F 16/9535* (2019.01)

(58) Field of Classification Search
CPC ........ G06F 17/30067; G06F 17/30126; G06F 17/30321; G06F 17/3053; G06F 17/30613; G06F 17/30619; G06F 17/30622; G06F 17/30831; G06F 17/30867; G06F 17/30873; G06F 17/30946; G06F 3/01; G06F 3/048; G06F 3/0481; G06F 3/04817; G06F 3/0482; G06F 3/0484; G06F 3/04842
See application file for complete search history.

(56) References Cited

U.S. PATENT DOCUMENTS

| | | | |
|---|---|---|---|
| 6,593,947 B1 * | 7/2003 | Ashe | G06F 9/451 |
| | | | 715/810 |
| 7,962,497 B2 * | 6/2011 | Albahari | G06F 8/24 |
| | | | 707/602 |
| 2008/0243802 A1 * | 10/2008 | Han | G11B 27/3027 |
| 2011/0099189 A1 * | 4/2011 | Barraclough | G06Q 10/00 |
| | | | 707/769 |

(Continued)

*Primary Examiner* — Diedra McQuitery
(74) *Attorney, Agent, or Firm* — Sterne, Kessler, Goldstein & Fox P.L.L.C.

(57) ABSTRACT

System, method, and computer product embodiments for proving a graphical user interface (GUI) for a GUI object are described. A computing device provides, within the GUI, a polymorphic lookup interface for retrieving a plurality of entity instances to relate to the GUI object. The computing device provides a plurality of types of entities within the polymorphic lookup interface. A type of entity selected from the plurality of types limits the possible entity instances that may be returned. Through the polymorphic lookup interface, the computing device enables a user to select two or more entity instances to relate to the GUI object. Each of the selected entity instances may be selected from a plurality of possible entity instances that are returned, where each possible entity instance is a same type of entity.

20 Claims, 8 Drawing Sheets

(56) References Cited

U.S. PATENT DOCUMENTS

| | | | |
|---|---|---|---|
| 2012/0185824 A1* | 7/2012 | Sadler | G06F 9/548 717/120 |
| 2012/0290967 A1* | 11/2012 | Scott | G06F 3/0481 715/780 |
| 2013/0061177 A1* | 3/2013 | Santos-Gomez | G06F 3/0482 715/825 |
| 2014/0108399 A1* | 4/2014 | White | G06F 16/24534 707/736 |
| 2014/0172925 A1* | 6/2014 | Goldbrenner | G06F 16/22 707/812 |
| 2015/0039614 A1* | 2/2015 | Daly | G06F 16/24 707/737 |

* cited by examiner

USER INTERFACE FOR POLYMORPHIC LOOKUP

BACKGROUND

A user interface is commonly implemented within a software application to enable users to communicate with database systems. Particularly, a user interface may include lookup functions to enable users to quickly query information from the database. But, current database systems include vast amounts of data of diverse types, which may delay how efficiently the user interface can provide a result to the user through the lookup functions. Additionally, current user interfaces are limited in scope and are inflexible, which further reduces the usefulness provided by the lookup functions.

BRIEF DESCRIPTION OF THE DRAWINGS

FIGS. 4-6 show example graphical user interfaces implementing polymorphic lookup interfaces according to some implementations.

DETAILED DESCRIPTION

I. Example System Overview

Figure 1:
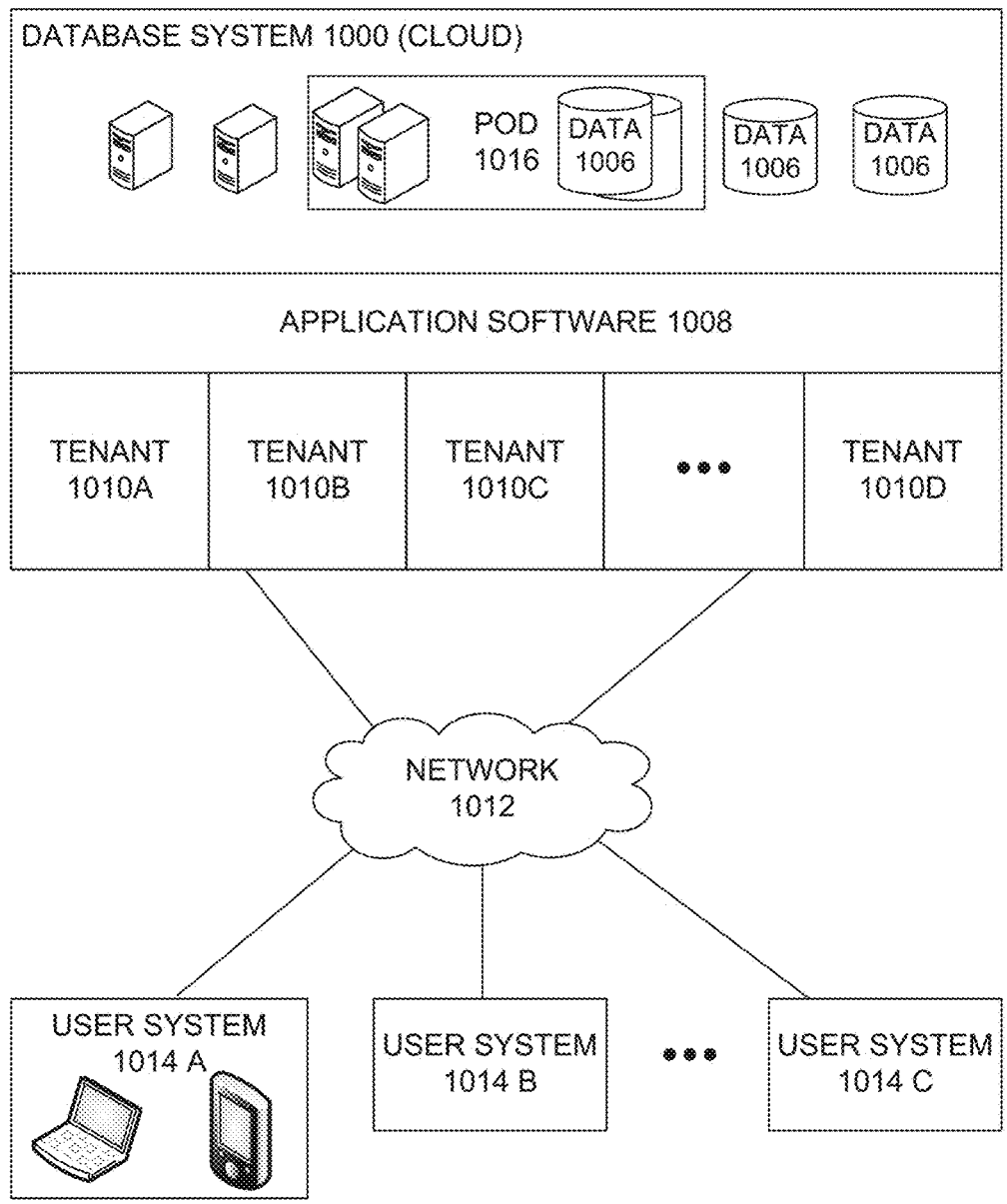
FIG. 1 shows an example database system according to some implementations.

FIG. 1 shows an example database system 1000 used in accordance with some implementations. Database system 1000 may include different application servers 1002 and databases 1004 connected together by networking equipment. Different combinations of application servers 1002 and data servers may execute different application software 1008 and access data 1006 stored in databases 1004.

User systems 1014 connect to application servers 1002 and databases 1004 through a network 1012. Network 1012 and the networks connecting together application servers 1002 and databases 1004 may include any combination of local area networks (LANs), wide area networks (WANs), telephone networks, wireless networks (Wi-Fi), cellular networks, or the like, or any combination thereof. Database system 1000 and user systems 1014 may operate within a private enterprise network and/or may operate within a publically accessible web-based network.

User systems 1014 may include desktop computers, personal computers (PCs), work stations, laptop computers, tablet computers, handheld computing devices, mobile cellular phones, smartphones, terminals, or any other device capable of accessing network 1012 and database system 1000. User systems 1014 use different protocols to communicate with database system 1000 over network 1012, such as transfer control protocol and Internet protocol (TCP/IP), hypertext transfer protocol (HTTP), and/or file transfer protocol (FTP). In one example, user systems 1014 may operate a web browser or operate applications for sending and receiving HTTP signals to and from an HTTP server operating in database system 1000.

Database system 1000 in conjunction with application software 1008 may provide an almost limitless variety of different services, such as providing software as a service (SaS), customer relationship management (CRM), enterprise resource planning (ERP), file sharing, web-based commerce, social networking, cloud-based computing and/or storage, or the like, or any combination thereof. Database system 1000 and/or network 1012 are alternatively referred to as the Internet, the cloud, and/or a cloud based computing system.

Multi-Tenant System

In one example, database system 1000 and application software 1008 may operate as a multi-tenant system (MTS). A multi-tenant system refers to a database system where different hardware and software are shared by one or more organizations represented as tenants 1010. For example, database system 1000 may associate a first tenant 1010A with an organization that sells airline services, associate a second tenant 1010B with an organization that sells widgets, and associate a third tenant 1008C with an organization that sells medical administration services. The multi-tenant system effectively operates as multiple virtual databases each associated with one of tenants 1010.

A pod 1016 may include groups of application servers 1002 and databases 1004 that share an instance of the multi-tenant system. Different pods 1016 may operate independently but may share some processing equipment, such as routers and storage area networks (SANs). For example, tenants 1010B and 1010C may operate within pod 1016 and a user associated with tenant 1010C may use user system 1014A to access the multi-tenant system operating in pod 1016. User system 1014A sends requests from the user to a load balancer in pod 1016 and the load balancer forwards the requests to one of application servers 1002 within pod 1016. Application server 1002 services the requests by executing application software 1008 within pod 1016 and/or accessing data 1006 from databases 1004 within pod 1016.

Database system 1000 may include hundreds of pods 1016 and a database administrator may assign thousands of tenants 1010 to the same pod 1016. The database administrator may add new pods 1016 for servicing additional tenants 1010 or may reassign tenants 1010 to different pods 1016. For example, one of tenants 1010 may use a relatively large amount of processing bandwidth and/or use a relatively large amount of storage space. The database administrator may reassign that tenant 1010 to a different pod 1016 with more processing and/or storage bandwidth. Thus, the multi-tenant system may scale for almost any number of tenants and users.

Figure 2:
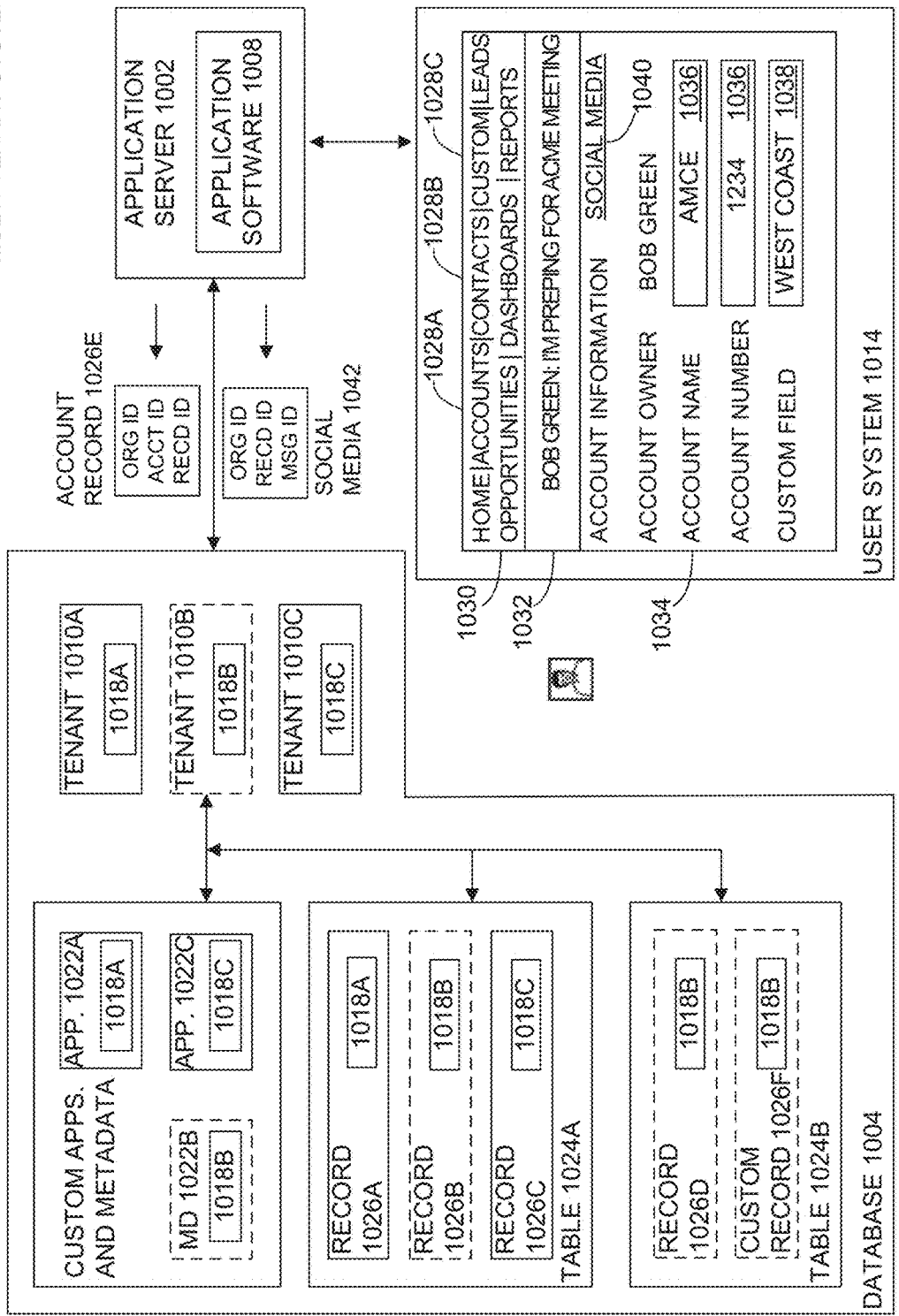
FIG. 2 shows an example multi-tenant system according to some implementations.

FIG. 2 shows a platform for a multi-tenant system (MTS) 1020 that may operate within database system 1000 of FIG. 1. Multi-tenant system 1020 may comprise a collection of objects. The objects may refer to entities such as users, tenants, accounts, contacts, leads, opportunities, reports, cases, files, documents, orders, price books, products, solutions, forecasts, or any other definable category. Objects also may refer to instances of the entities such as the data for the individual users, tenants, accounts, contacts, leads, opportunities, reports, cases, etc.

Objects also may refer to tables 1024 that include fields or a schema describing the entities. For example, table 1024A may define fields for customer contacts such as name, address, phone number, fax number, etc. The same or another table 1024B may define fields for purchase orders such as customer, product, sale price, date, etc. Objects also may refer to records 1026 that contain data or instances for the entities and fields. For example, record 1026A may contain the specific name, address, phone number, fax number, etc. for a particular customer contact and record 1026C may contain the specific customer, product, sale price and date for a particular purchase order.

Multi-tenant system 1020 may use identifiers to maintain relationships between different objects. For example, application software 1008 may assign unique organization identifiers (org ids) 1018A, 1018B, and 1018C to tenants 1010A, 1010B, and 1010C, respectively. Application software 1008 then associates other objects with org ids 1018.

For example, a user may log into multi-tenant system 1020 via user system 1014. Application software 1008 accesses one of tables 1024 that associates a password for the user with tenant 1010B. Application software 1008 then identifies different records 1026B, 1026D, and 1026F associated with org id 1018B and displays data from records 1026B, 1026D, and 1026F to the user via user system 1014. Application programmer interfaces (APIs) also may access data in multi-tenant system 1020 via user system 1014 in a same manner as users to maintain similar security protocols and access privileges.

In one example, application software 1008 may display a toolbar 1030 identifying different entities 1028 associated with tenant 1010B. The user may select tabs in toolbar 1030 to view, edit, and/or create instances (data) of entities 1028. For example, the user may select a tab associated with accounts entity 1028A and select options for creating a new account 1034. The user enters data for new account 1034 into fields 1036 and application software 1008 creates a record 1026E containing the data. Application software 1008 assigns record 1026E org id 1018B for tenant B, an account identifier (acct id), and a record identifier (recd id) before storing record 1026E in one of tables 1024.

Multi-tenant system 1020 may establish relationships between different entities 1028. For example, the user may associate different contacts 1028B with account 1034. The user may select a tab in toolbar 1030 associated with contacts 1028B and enter contact information for a customer. Application software 1008 creates another record 1026 containing the contact information that includes the record id for account 1034. Users accessing account 1034 can then also view associated contacts 1028B.

Multi-tenant system 1020 enable users to create custom metadata 1022B for tenant specific functions, objects, entities, categories, and/or data. For example, an administrator for tenant 1010B, or a third party vendor, may create a custom entity 1028C with a unique combination of fields 1036 and 1038. Application software 1008 creates metadata 1022B defining custom entity 1028C and then accesses metadata 1022B enabling users for tenant 1010B to view, edit, and create custom records 1026F for custom entity 1028C.

Multi-tenant system 1020 also enable users to create and execute custom application software 1022A and 1022C. For example, the organization associated with tenant 1010C may provide medical administration services. The administrator for tenant 1010C, or a third party vendor, may create custom application software 1022C that generates medical reports and/or manages medical records. Application software 1008 associates custom application software with org id 1018C allowing users for tenant 1010C to access custom application software 1022C and generate and/or manage the medical reports and records.

In some implementations, multi-tenant system 1020 may associate users with user profiles and assign the users unique user identifiers (user ids). The user profiles may include a collection of data about a user, such as a name, a title, a phone number, a photo, a biographical summary, or a status. Multi-tenant system 1020 also may associate the users with permission profiles that determine which records 1026 and application software 1008 and 1022 the users may access. For example, a permission profile for a first user may allow access to data and software for a salesperson and a permission profile for a second user may allow access to data and software for an administrator.

A group may refer to a collection of users within an organization. In some implementations, a group may include users with a similar attribute or a similar membership or subscription. Multi-tenant system 1020 may assign groups of users unique group identifiers (group ids) and provide the groups various visibilities. For example, some groups may be private while others may be public. To become a member within a private group, users may request subscription to the group and acceptance by an administrator or group owner.

Social Networks

Multi-tenant system 1020 may associate social media with different records 1026. For example, a user may select an icon 1040 to post a message 1032 relating to account 1034. Application software 1008 generates social media data 1042 that includes message 1032, org id 1018B for tenant 1010B, the record identifier for account 1034, and a unique message identifier (msg id). Users associated with tenant 1010B then may access account 1034, view associated message 1032, and create other related messages. For example, another user may access account 1034 and post a comment to message 1032. Application software 1008 creates additional social media data that includes the comment, org id 1018B for tenant 1010B, and the msg id for message 1032. Thus, users accessing account 1034 may not only view, edit, and/or create account 1034, but also may view and/or post social media, such as message 1032, associated account 1034.

Message 1032 is alternatively referred to as a feed item and may include any type of information viewable in a feed, such as user-generated textual posts or comments, documents, audio data, image data, video data, or any other type of data. Feed items 1032 may include links or attach to other documents or files. Feed items 1032 may be associated via identifiers with one or more objects, entities, users, groups, records, or other feeds. Multi-tenant system 1020 also may transmit email notifications or other types of network communications to users associated with any object, entity, group, record, or feed.

More details regarding database system 1000, multi-tenant system 1020, and social networks are described in U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010; U.S. Pat. No. 7,779,039, titled CUSTOM ENTITIES AND FIELDS IN A MULTI-TENANT DATABASE SYSTEM, by Weissman et al., issued on Aug. 17, 2010; and U.S. Pat. No. 8,478,722, titled ENTERPRISE LEVEL BUSINESS INFORMATION NETWORKING FOR CHANGES IN A DATABASE, by Peter Lee et al., issued on Jul. 2, 2013 which are all hereby incorporated by reference in its entirety and for all purposes.

Figure 3:
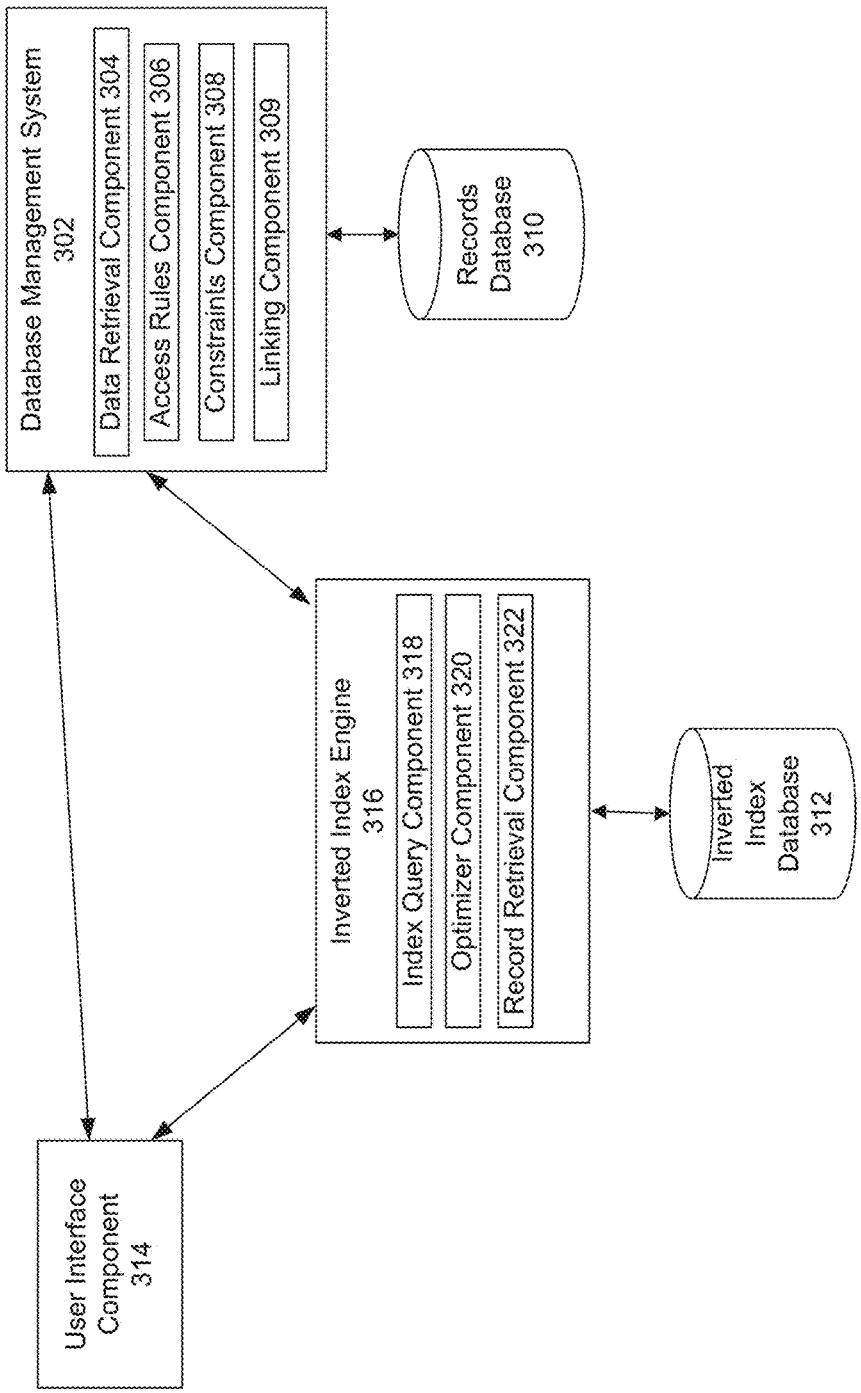
FIG. 3 shows an example of an application server for providing a polymorphic lookup interface according to some implementations.

FIG. 3 shows an application server 300 for providing a polymorphic lookup interface according to some implementations. In an embodiment, application server 300 may be an implementation of application server 1002 of FIG. 1. In an embodiment, application software 1008 may implement some or all of the functionalities of application server 300. As shown, application server 300 includes user interface component 314, inverted index engine 316, inverted index database 312, database management system (DBMS) 302, and records database 310. For ease of reference, descriptions of FIG. 3 may refer to FIG. 4, which depicts an example graphical user interface (GUI) 400 including polymorphic lookup interface 401.

In an embodiment, application server 300 may provide GUI 400 for a GUI object, for example, "Create Event," to a user via, for example, user system 1014 of FIG. 1. As shown in GUI 400 of FIG. 4, application server 300 may provide user field 410, polymorphic lookup interface 401, and save option 414. In an embodiment, polymorphic lookup interface 401 may include visual icons for selectable entity types 406, selected entity type 404, and selected entity instances 408. Polymorphic lookup interface 401 may also include search field 402 for receiving, from the user, a series of characters used in looking up possible entity instances.

Returning to FIG. 3, user interface component 314 may interface lookup functions and results provided by application server 300 with lookup results provided to user within polymorphic lookup interface 401. In an embodiment, user interface component 314 receives selected entity type 404 from polymorphic lookup interface 401 of GUI 400. Selected entity type 404, represented as an "Accounts" icon in GUI 400, may be selected by the user from selectable entity types 406. In an embodiment, in a business management context, selectable entity types 406 may include "Accounts," "Contacts," "Leads," and "Opportunities." Upon receiving selected entity type 404, user interface component 314 may forward selected entity type 404 to inverted index engine 316 to condition the types of results provided to polymorphic lookup interface 401.

In an embodiment, user interface component 314 receives a series of characters from search field 402. As a user inputs or updates the series of characters in search field 402, user interface component 314 may receive the updated one or more characters and perform lookup functions based on the updated one or more characters. User interface component 314 may send the series of characters to inverted index engine 316 that performs efficient lookup of relevant search results.

In an embodiment, user interface component 314 provides visual icons for selected entity instances 408 within polymorphic lookup interface 401. Selected entity instances 408 may represent a plurality of entity instances selected by a user to relate to a GUI object, such as "Create Event." When GUI 400 is terminated, for example, when the user selects save option 414, user interface component 314 may forward selected entity instances 408 to DBMS 302 or inverted index engine 316. DBMS 302 may associate, within records database 310, a plurality of selected entity instances 408 with a database object representing the GUI object of GUI 400. Similarly, inverted index engine 316 may update inverted index database 312 to include the associations between selected entity instances 408 and the GUI object.

Inverted index engine 316 may perform efficient and fast lookup of possible entity instances desired by a user based on an input from search field 402 conditioned on selected entity type 404. In an embodiment, inverted index engine 316 may access inverted index database 312 to speed up the processing of lookup functions. In an embodiment, inverted index engine 316 may be based on an improved implementation of an open source enterprise search platform such as, for example, the SOLR platform. These improvements may be described with respect to the functionality provided by the components of inverted index engine 316.

Inverted index database 312 may be designed to store associations between words and record identifiers (IDs) such that each word may be associated with a plurality of record IDs. These associations may be stored in a dictionary format mapping words to respect lists of record IDs. In an embodiment, each of the record IDs may be associated with a corresponding entity instance containing the associated or mapped word. For example, a word "Gene" may be associated with a list of record IDs corresponding to the following entity instances: "GenePoint," "Gene Tech," and "Gene Institute." By storing the lists of record IDs, inverted index engine 316 may look up the word directly for possible record IDs instead of requiring DMBS 302 to scan each record from records database 310 for any record containing that word.

In an embodiment, inverted index database 312 may include separate indexes for each type of selectable entity types 406. By providing separate indexes, inverted index engine 316 may condition the returned entity instances based on selected entity type 404. To implement the fast lookup functions, inverted index engine 316 may include index query component 318, optimizer 320, and record retrieval component 322.

In contrast, a conventional Structured Query Language (SQL) based database, which does not maintain indexes based on words, implements searching scheme that are slow and inefficient. For example, when a user queries a specific word, the SQL-based database may need to fully scan all the content of the database because the SQL database cannot ensure that an inner portion of the record does not contain the queried word. By maintaining inverted index database 312, inverted index 316 may perform a fast lookup of a plurality of record IDs corresponding to the queried word.

Index query component 318 queries inverted index database 312 for relevant record IDs based on an inputted series of characters received by user interface component 314. In an embodiment, in addition to maintaining an index of words, inverted index database 312 may include indexes for a series of one or more characters. For example, inverted index database 312 may include separate indexes for one character, two characters, three characters, or four characters. In an embodiment, inverted index database 312 include a hierarchy of indexes such that matching a series of one or more characters may direct inverted index engine 316 to query a separate index containing the matching series of one or more characters.

For example, inverted index database 312 may include an index for two characters. User interface component 314 may receive two characters "Ge" before a user completely inputs the complete word such as, for example, "Gene." Index query component 318 may query inverted index database 312 based on "Ge," which may match the index for two character sequences. The "Ge" entry of the two character index may be further associated with a word index having words starting with "Ge." By implementing the hierarchy of indexes, inverted index database 312 may be more efficiently maintained and more efficiently return relevant search results. Therefore, although the user has not completed typing a complete word, inverted index database 312 may return a plurality of record IDs from the word index having record IDs that corresponds to words starting with or containing "Ge."

Optimizer component 320 may implement rules for prioritizing which entity instances are returned to the user enabling the user to more efficiently select a desired entity instance. When the user selects one of the returned entity instances, the selected entity instances may be saved in selected entity instances 408 field of polymorphic lookup interface. In an embodiment, a rule may apply to an input from search field 402 including two or more words. In this scenario, inverted index database 312 may additionally include indexes for a sequence of two more words. Optimizer component 320 may prioritize entity instance results provided by the multi-word index over entity instance results provided by the default one word index. For example, when a user inputs "John Smith" into search field 402, optimizer component 320 may implement this rule to return "John Smith" first before returning other results, such as "Smith John."

In an embodiment, instead of utilizing multi-word indexes, optimizer component 320 may implement relevancy scores for possible matching entity instances to prioritize the entity instances returned to the user in polymorphic lookup interface 401. For example, for multi-word inputs, such as "John Smith," optimizer component 320 may add higher scores to matching entity instances having an exact match or in the same order. Therefore, a matching entity instance having "John" appear before "Smith" may receive a higher score than another matching instance having "John" appear after "Smith."

In an embodiment, optimizer component 320 may also assign or update relevancy scores based on other attributes of the matching entity instances returned to inverted index engine 316. For example, each matching entity instance may have an associated page view popularity metric or the number of "hits" within a period of time. Additionally, matching entity instances associated with user field 410 may also have a higher relevancy score.

Record retrieval component 322 may retrieve, from records database 310, the records corresponding to the record IDs returned to inverted index engine 316. In an embodiment, record retrieval component 322 issues a query to DBMS 302 to query the records corresponding to the record IDs. Then, inverted index engine 316 may receive a plurality of records from DBMS 302. In an embodiment, when record retrieval component 322 receives the plurality of records from DBMS 302, optimizer component 320 may prioritize the records, each representing an entity instance, returned to the user.

DBMS 302 may implement functions for retrieving records from records database 310. DBMS may also manage the associations, metadata, and record data stored in records database 310. To provide the lookup functionality of polymorphic lookup interface 401, DBMS 302 may include access rules component 304, data retrieval component 306, constraints component 308, and linking component 309.

In an embodiment, DBMS 302 may receive a query issued by record retrieval component 322 of inverted index engine 316. The query may include a plurality of record IDs, each of which may identify a record from records database 310. Data retrieval component 304 may retrieve, from records database 310, the data records corresponding to the plurality of record IDs. Data retrieval component 304 may also retrieve metadata associated with each record ID. For example, metadata may include a popularity metric such as a number of "hits," associated users, access permissions, creation dates, among other types of attributes of the record data.

Access rules component 306 may filter the queried record data based on access permissions to determine which records to return in the returned plurality of entity instances. For example, access rules component 306 may filter out queried record data having an associated access permission that indicate a user of user field 410 or the user operating GUI 400 does not have permission to access that record data.

Similarly, constraints component 308 may filter the queried record data based on other constraints applied to the queried record data or constraints stored within DBMS 302. For example, a constraint may be to return the top most popular record data, e.g., record data having the most "hits."

Linking component 309 may update the associations stored in records database 310 between the object represented by GUI 400 and selected entity instances 408. In an embodiment, when GUI 400 is terminated, user interface 314 may receive selected entity instances 408 to associate with the GUI object, e.g., "Create Event," or GUI 400. For example, GUI 400 may be terminated when the user selects save option 414 to save the edits made to GUI 400. The selected entity instances 408 may be forwarded to DBMS 302 where linking component 309 adds the associations to the GUI object within records database 310. Therefore, application server 300 provides to user system 1014 of FIG. 2 polymorphic lookup interface 401 enabling a user to efficiently select a plurality of entity instances to relate to the GUI object represented by GUI 400.

Figure 4:
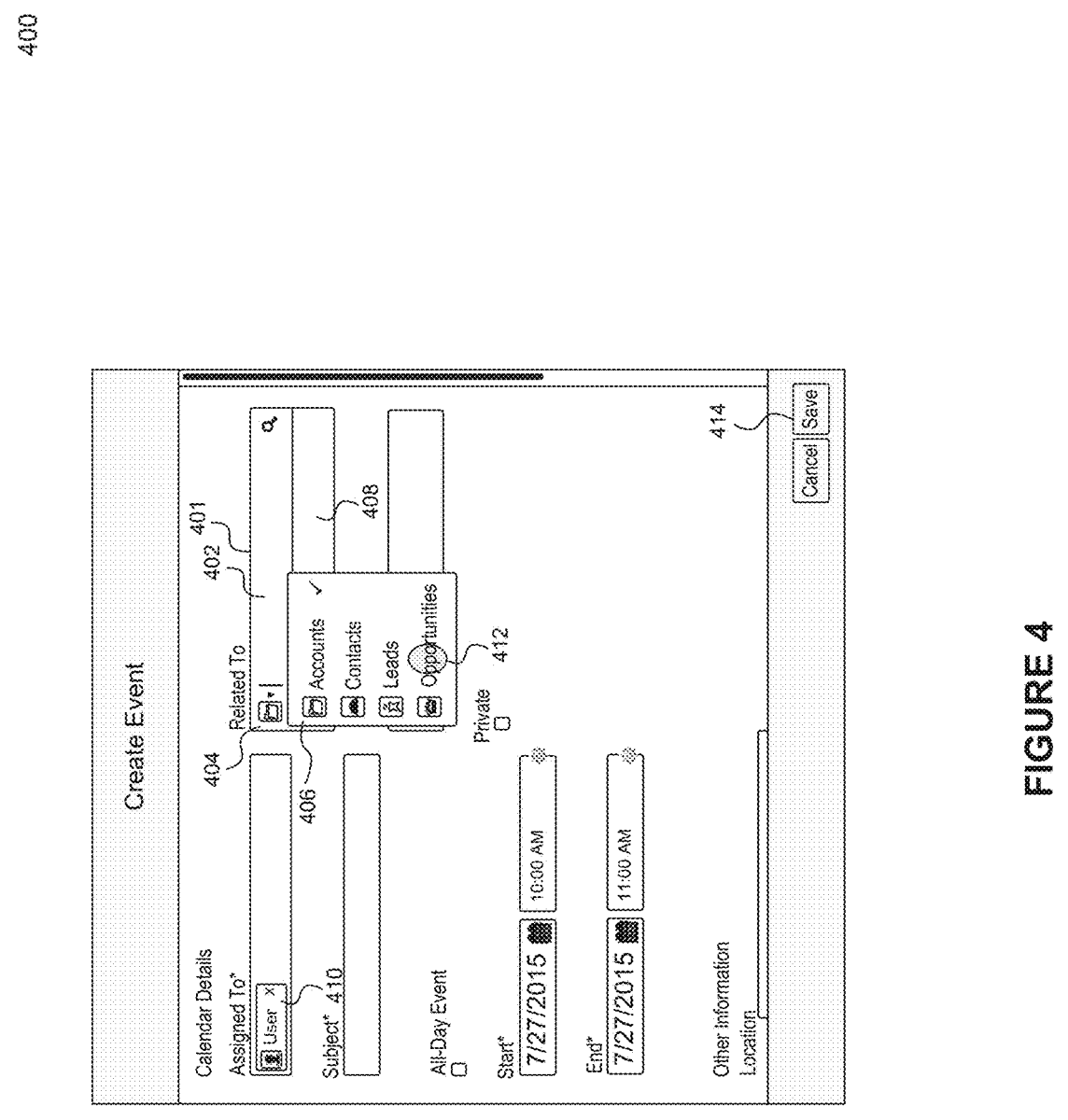
Figure 5:
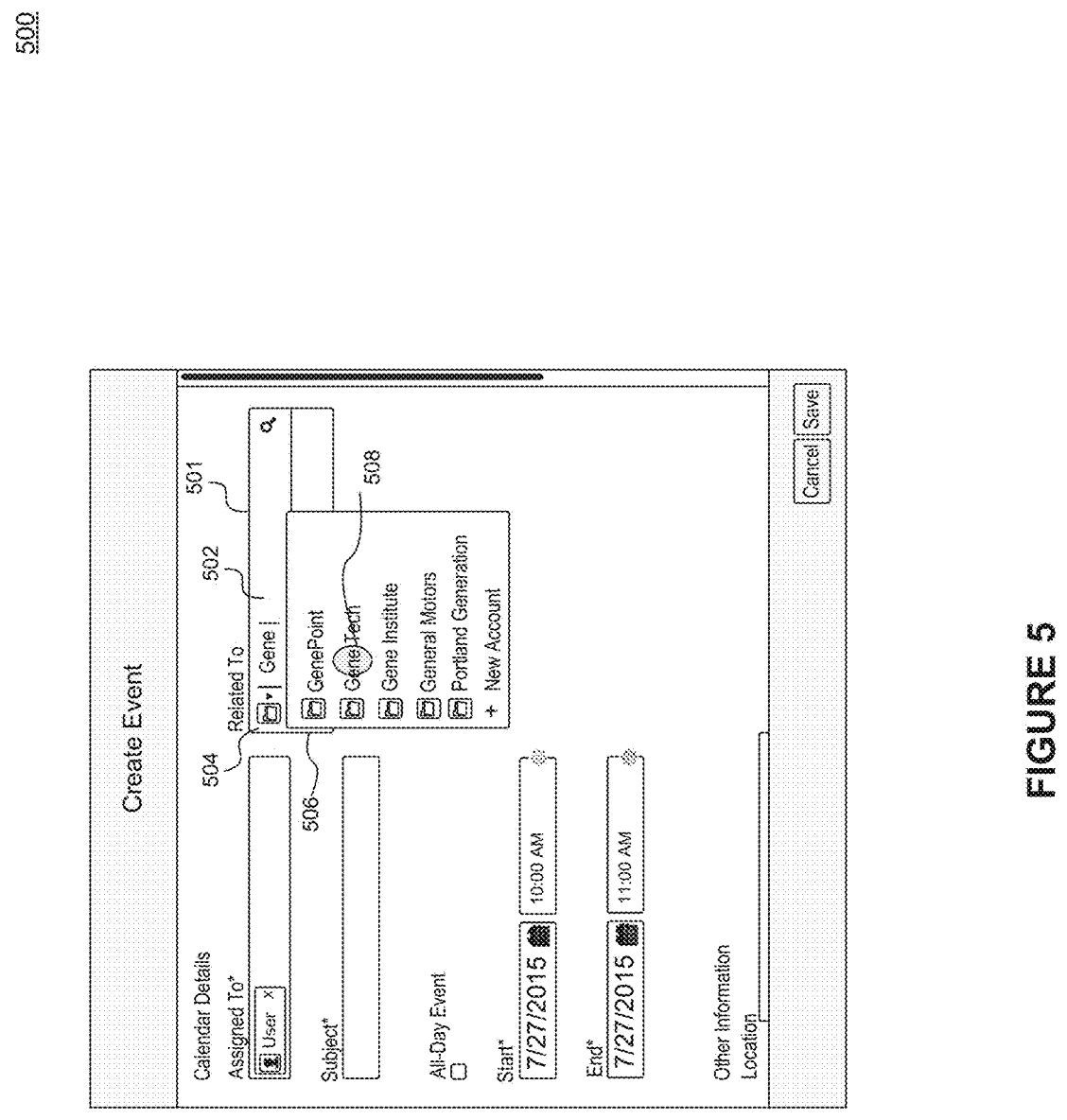
Figure 6:
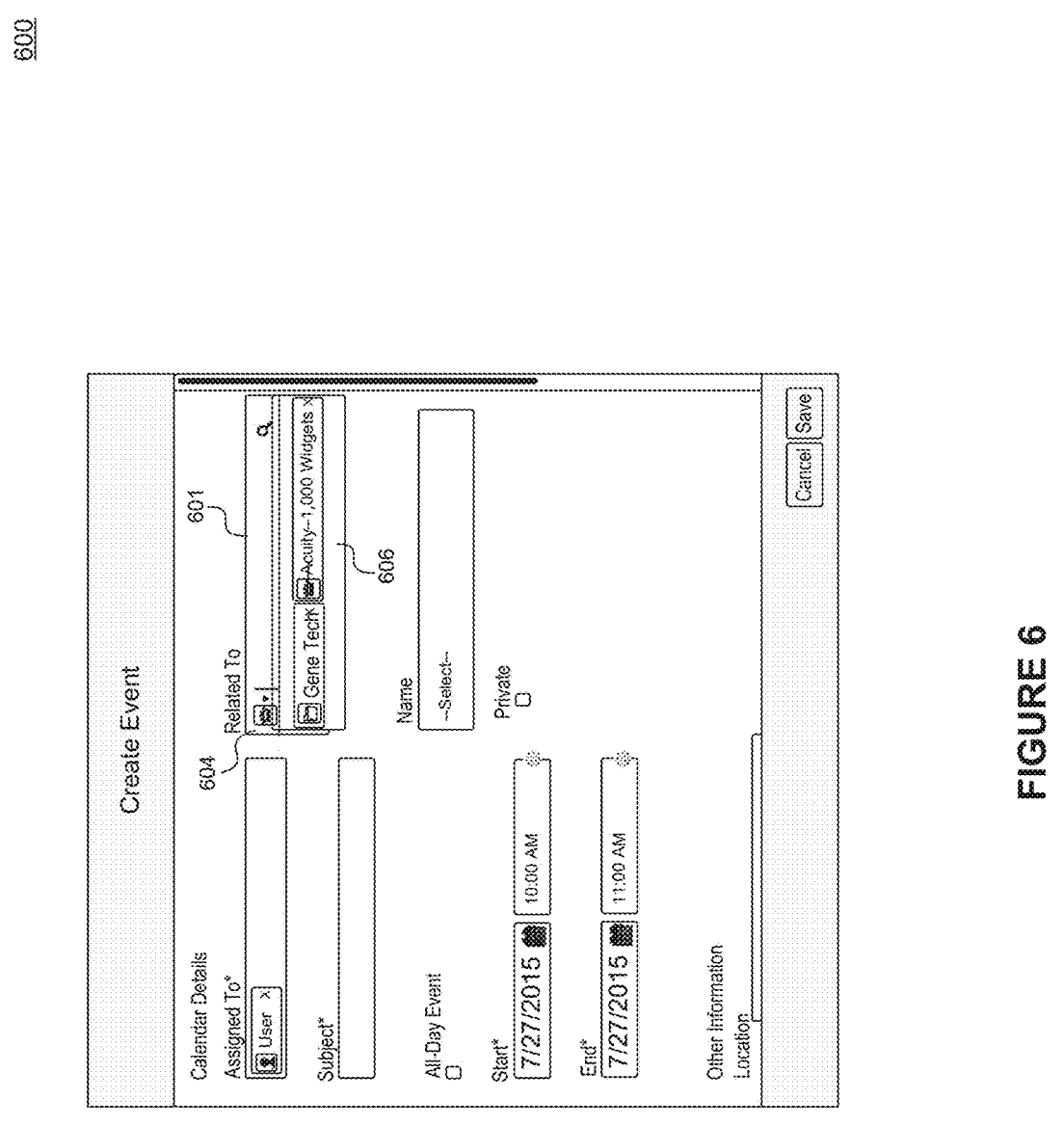

FIGS. 4-6 illustrate example GUIs implementing polymorphic lookup interfaces according to some implementations. As described above, FIG. 4 illustrates GUI 400 including polymorphic lookup interface 401 provided by, for example, application server 300 of FIG. 3. When a user operating GUI 400 selects selected entity type 404, represented as the "Accounts" visual icon, from selectable entity types 406, GUI 400 may send selected entity type 404 to user interface component 314 of application server 300. As shown, user cursor 412 indicates that the user may select the "Opportunity" entity type from selectable entity types 406.

FIG. 500 illustrates an example GUI 500 including polymorphic lookup interface 501. As shown, the user has selected an "Accounts" entity type as represented by the "Accounts" icon of selected entity type 504. GUI 500 may send selected entity type 504 of "Accounts" to application server 300. Upon receiving selected entity type 504, application server 300 may condition the returned entity instances to have that selected entity type 504, e.g., to be an "Accounts" instance. The user may have typed "Gene" into search field 502. Application server 300 may receive the type input characters and inverted index engine 316 may query inverted index database 312 for record IDs associated with the word "Gene." Inverted index engine 316 may query DBMS 302 for a plurality of record data corresponding to record IDs returned by inverted index database 312. Each of inverted index engine 316 and DBMS 302 may filter or prioritize the entity instances returned to user system 1014. For example, as shown in GUI 500, returned entity instances 506 depicts the five most likely entity instances corresponding to the input "Gene" of search field 502. Upon selection of "Gene Tech" via cursor 508, the user may associate the entity instance, "Gene Tech," with the GUI object "Create Event."

FIG. 600 illustrates an example GUI 600 including polymorphic lookup interface 601. When the user selects "Gene Tech" as a desired entity instance, GUI 600 may save the selected entity instance "Gene Tech" as one of selected entity instances 606, each represented by a corresponding visual icon and associated entity type. For example, GUI 600 may save two entity instances, "Gene Tech" and "Acuity-1,000 Widgets," to be related to the event to be created. The "Gene Tech" entity instance may be of an "Accounts" entity type as indicated by the file visual icon. Similarly, the "Acuity-1,000 Widgets" entity instance may be of an "Opportunity" entity type as indicated by the crown icon. Therefore, GUI 600 illustrates polymorphic lookup interface 601 enabling a user to relate two or more entity instances with a GUI object, such as "Create Event." Each of the two or more entity instances may be provided via dropdown lists of possible entity instance results as shown in FIG. 5, from which the user may select a relevant entity instance.

II. Example Method

Figure 7:
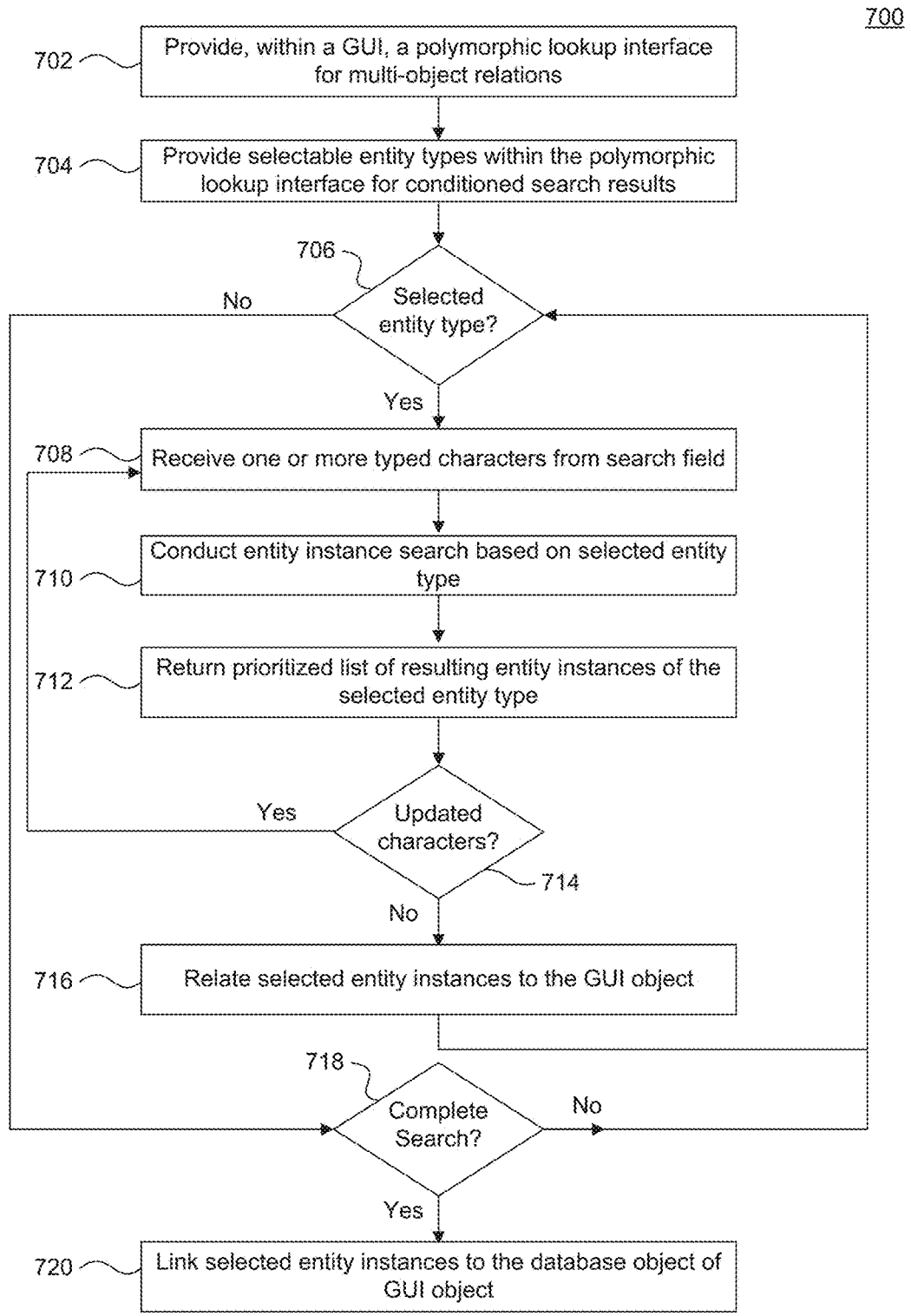
FIG. 7 shows an example method for providing a polymorphic lookup interface according to some implementations.

FIG. 7 illustrates an example method 700 for providing a polymorphic lookup interface according to some implementations. Method 700 may be performed by processing logic that may comprise hardware (e.g., circuitry, dedicated logic, programmable logic, microcode, etc.), software (e.g., instructions running on a processing device), or a combination thereof. In an embodiment, steps of method 700 may be performed by components of application server 300 from FIG. 3. For ease of reference and without limitation, descriptions of method 700 may refer to GUI 500 and polymorphic lookup interface 401 described with respect to FIGS. 3-4. Method 700 may apply to other GUIs, such as those described with respect to FIGS. 5-6.

In step 702, application server 300 provides to a user, via user system 1014 of FIGS. 1-2, polymorphic lookup interface 401 within GUI 400 for a GUI object, such as a "Create Event" object of from FIG. 4. The provided polymorphic lookup interface 401 enables a user operating GUI 400 to relate multiple objects, specifically entity instances, with the GUI object.

In step 704, application server 300 provides selectable entity types 406 options within polymorphic lookup interface 401 for conditioned search results. These selectable options may condition the type of entity instances to be queried by inverted index engine 316 or DBMS 302 in determining the plurality of entity instances to return to the user in GUI 400. For example, in a software application for business development, selected entity types 406 may include "Accounts," "Contacts," "Leads," and "Opportunities" among other types of search results.

In an embodiment, steps 706-718 describe functionalities provided by polymorphic lookup interface 401 that enables a user to select a plurality of entity instances to relate to the object represented by the GUI object of GUI 400. Each of the selected entity instances may be assigned to a specific type of entity.

In step 706, user interface component 314 receives a selected entity type within polymorphic lookup interface 401. The selected entity type may be displayed as a visual icon corresponding to selected entity type 404 of GUI 400. As described with respect to FIG. 3, inverted index engine 316 may condition the types of record IDs to query based on the selected entity type 404 such that a returned list of possible entity instances are all of the selected entity type 404.

In step 708, user interface component 314 receives, in real-time, one or more characters typed in search field 402 of polymorphic lookup interface 401. Then, user interface component 314 forwards the updated or inputted characters to inverted index engine 316.

In step 710, inverted index engine 316 conducts an entity instance search based on the selected entity type and the one or more received characters of step 708. In an embodiment, index query component 318 queries one or more indexes of inverted index database 312 to determine a list of record IDs, each of which may be related to information containing the sequence of characters. Record retrieval component 322 may query records database 310 via DBMS 302 to retrieve the record data corresponding to the list of record IDs. For example, data retrieval component 304 may query records database 310 for the data records. To provide the search result back to the user, data retrieval component 304 sends the queried data records to inverted index engine 316.

In step 712, application server 300 returns, to the user, a prioritized list of resulting entity instances of selected entity type 400 of step 706. Particularly, access rules component 306 or constraints component 308 may filter out the matching data records from records database 310 and queried by data retrieval component 304. In an embodiment, optimizer component 320 may implement scoring metrics and rules to specify an order of the returned list of possible entity instances to be selected by the user. For example, as shown by returned entity instances 506, polymorphic lookup interface 400 may display the retrieved record data as ranked information, where most relevant or likely entity instances, such as "GenePoint" and "Gene Tech," are provided near the top of the list.

In step 714, user interface component 314 detects whether one or more updated characters have been typed into search field 402 of polymorphic lookup interface 401. If one or more updated characters have been detected, method 700 proceeds to 708.

In step 716, GUI 400 relates selected entity instances to the GUI object of GUI 400. For example, selected entity instances may be saved as selected entity instances 408 field of—polymorphic lookup interface 401.

In step 718, if an additional search is queried, method 700 proceeds to step 706. Regardless of whether an additional search is queried, polymorphic lookup interface 401 displays the one or more selected entities within selected entity instances 408 field. If no more search is requested or when GUI 400 terminates, method 700 proceeds to step 720. For example, application server 300 may detect the completion of the search when the user exits out of GUI 400 when, for example, save option 414 is selected by the user to save the information within GUI 400 for the GUI object "Create Event."

In step 720, upon completion of the search, linking component 309 links or associates the plurality of selected entity instances 408 with the database object corresponding to the GUI object of "Create Event." In an embodiment, linking component 309 may save the relations within records database 310.

III. Example Computer Implementation

Figure 8:
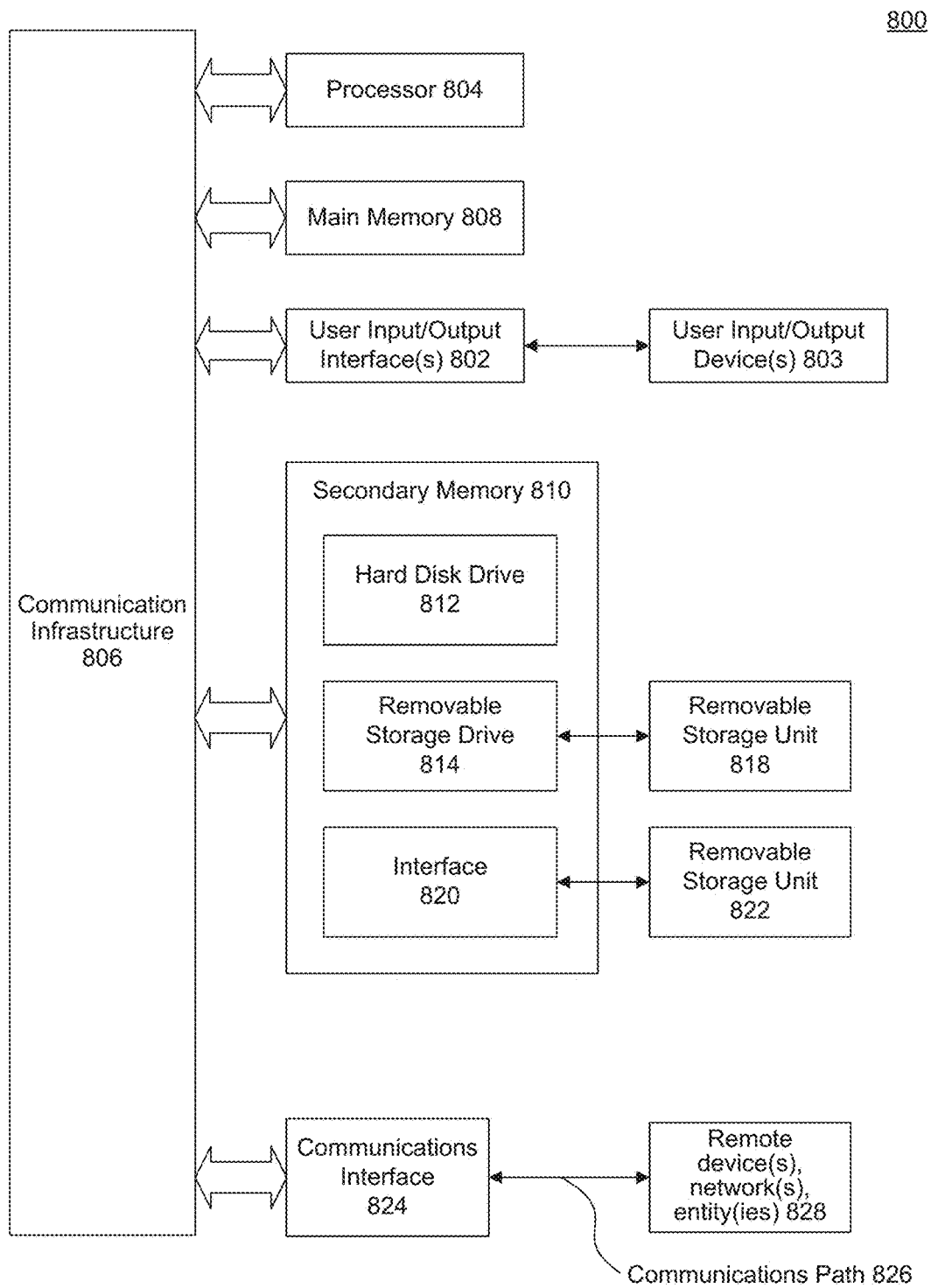
FIG. 8 shows an example computer system according to some implementations.

Various embodiments, such as application servers 1002 or pod 1016 of FIG. 1, can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   providing, by a computing device, a graphical user interface (GUI) for a GUI object, wherein the GUI includes a polymorphic lookup interface for retrieving a first plurality of entity instances corresponding to a first entity type and a second plurality of entity instances corresponding to a second entity type to relate to the GUI object, wherein the first entity type and the second entity type are included in a plurality of entity types;
   receiving a selection of the first entity type from the plurality of entity types;
   in response to receiving the selection of the first entity type, returning the first plurality of entity instances in the polymorphic lookup interface;
   receiving a selection of the second entity type from the plurality of entity types;
   in response to receiving the selection of the second entity type, returning the second plurality of entity instances in the polymorphic lookup interface, wherein at least one of the returned first plurality of entity instances or the returned the second plurality of entity instances is based on querying an inverted index database comprising a hierarchy of indexes, and wherein the hierarchy of indexes are searched based on a series of characters received via a search field of the polymorphic lookup interface;

receiving, within the polymorphic lookup interface, a selection of a first entity instance of the first entity type from the first plurality of entity instances and a selection of a second entity instance of the second entity type from the second plurality of entity instances;

in response to receiving the selection of the first and second entity instances, relating, by the computing device, the first and second entity instances with the GUI object; and storing the related first and second entity instances in a database object corresponding to the GUI object.

2. The method of claim 1, further comprising:
using the series of characters to query the inverted index database to retrieve record identifiers; and
querying a records database to obtain data records corresponding to the record identifiers.

3. The method of claim 2, wherein the inverted index database includes an index for two or more words.

4. The method of claim 2, wherein the series of characters includes an ordered list of words, and wherein the returned first plurality of entity instances or the returned second plurality of entity instances prioritizes possible entity instances having the same order as the ordered list of words.

5. The method of claim 2, further comprising:
filtering the queried data records based on access rules or search constraints.

6. The method of claim 5, further comprising:
assigning a relevancy score to each of the filtered queried data records, wherein the returned first plurality of entity instances or the returned second plurality of entity instances correspond to the filtered queried data records based on the assigned relevancy score.

7. The method of claim 6, wherein the relevancy score is based on one or more of an order of a sequence of the series of characters, a user identifier identifying the user operating the GUI, or a page view metric.

8. A system, comprising:
a memory; and
at least one processor coupled to the memory and configured to:
provide a graphical user interface (GUI) for a GUI object, wherein the GUI includes a polymorphic lookup interface for retrieving a first plurality of entity instances corresponding to a first entity type and a second plurality of entity instances corresponding to a second entity type to relate to the GUI object, wherein the first entity type and the second entity type are included in a plurality of entity types;
receive a selection of the first entity type from the plurality of entity types;
in response to receiving the selection of the first entity type, return the first plurality of entity instances in the polymorphic lookup interface;
receive a selection of the second entity type from the plurality of entity types;
in response to receiving the selection of the second entity type, return the second plurality of entity instances in the polymorphic lookup interface, wherein at least one of the returned first plurality of entity instances or the returned the second plurality of entity instances is based on querying an inverted index database comprising a hierarchy of indexes, and wherein the hierarchy of indexes are searched based on a series of characters received via a search field of the polymorphic lookup interface;

receive, within the polymorphic lookup interface, a selection of a first entity instance of the first entity type from the first plurality of entity instances and a selection of a second entity instance of the second entity type from the second plurality of entity instances;

in response to receiving the selection of the first and second entity instances, relate the first and second entity instances with the GUI object; and store the related first and second entity instances in a database object corresponding to the GUI object.

9. The system of claim 8, wherein the at least one processor is further configured to:
use the series of characters to query the inverted index database to retrieve record identifiers; and
query a records database to obtain data records corresponding to the record identifiers.

10. The system of claim 9, wherein the inverted index database includes an index for two or more words.

11. The method of claim 9, wherein the series of characters includes an ordered list of words, and wherein the returned first plurality of entity instances or the returned second plurality of entity instances prioritizes possible entity instances having the same order as the ordered list of words.

12. The method of claim 9, wherein the at least one processor is further configured to:
filter the queried data records based on access rules or search constraints.

13. The method of claim 12, wherein the at least one processor is further configured to:
assign a relevancy score to each of the filtered queried data records, wherein the returned first plurality of entity instances or the returned second plurality of entity instances correspond to the filtered queried data records based on the assigned relevancy score.

14. The method of claim 13 wherein the relevancy score is based on one or more of an order of a sequence of the series of characters, a user identifier identifying a user operating the GUI, or a page view metric.

15. A non-transitory computer-readable device having instructions stored thereon that, when executed by at least one computing device, causes the at least one computing device to perform operations comprising:
providing, by a computing device, a graphical user interface (GUI) for a GUI object, wherein the GUI includes a polymorphic lookup interface for retrieving a first plurality of entity instances corresponding to a first entity type and a second plurality of entity instances corresponding to a second entity type to relate to the GUI object, wherein the first entity type and the second entity type are included in a plurality of entity types;
receiving a selection of the first entity type from the plurality of entity types;
in response to receiving the selection of the first entity type, returning the first plurality of entity instances in the polymorphic lookup interface;
receiving a selection of the second entity type from the plurality of entity types;
in response to receiving the selection of the second entity type, returning the second plurality of entity instances in the polymorphic lookup interface, wherein at least one of the returned first plurality of entity instances or the returned the second plurality of entity instances is based on querying an inverted index database comprising a hierarchy of indexes, and wherein the hierarchy of indexes are searched based on a series of characters received via a search field of the polymorphic lookup interface;

receiving, within the polymorphic lookup interface, a selection of a first entity instance of the first entity type from the first plurality of entity instances and a selection of a second entity instance of the second entity type from the second plurality of entity instances;

in response to receiving the selection of the first and second entity instances, relating, by the computing device, the first and second entity instances with the GUI object; and storing the related first and second entity instances in a database object corresponding to the GUI object.

16. The non-transitory computer-readable device of claim 15, the operations further comprising:

using the series of characters to query the inverted index database to retrieve record identifiers; and querying a records database to obtain data records corresponding to the record identifiers.

17. The non-transistor computer-readable device of claim 16, wherein the inverted index database includes an index for two or more words.

18. The non-transitory computer-readable device of claim 16, wherein the series of characters includes an ordered list of words, and wherein the returned first plurality of entity instances or the returned second plurality of entity instances prioritizes possible entity instances having the same order as the ordered list of words.

19. The non-transitory computer-readable device of claim 16, the operations further comprising:

filtering queried data records based on access rules or search constraints; and assigning a relevancy score to each of the filtered queried data records, wherein the returned first plurality of entity instances or the returned second plurality of entity instances correspond to the filtered queried data records based on the assigned relevancy score.

20. The non-transitory computer-readable device of claim 19, wherein the relevancy score is based on one or more of an order a sequence of the series of characters, a user identifier identifying a user operating the GUI, or a page view metric.

* * * * *